United States Patent [19]

Suzuki et al.

[11] 4,447,704
[45] May 8, 1984

[54] SEMICONDUCTOR DEVICE FOR DRIVING THERMAL PRINT HEADS

[75] Inventors: Hirokazu Suzuki, Yamato; Takehiro Akiyama, Yokohama, both of Japan

[73] Assignee: Fujitsu Limited, Kawasaki, Japan

[21] Appl. No.: 458,849

[22] Filed: Jan. 18, 1983

[30] Foreign Application Priority Data

Jan. 19, 1982 [JP] Japan .................................. 57-006335

[51] Int. Cl.³ ...................... H05B 3/00; G01D 15/10; B41J 3/20
[52] U.S. Cl. .................................... 219/216; 400/120; 400/279; 346/76 PH
[58] Field of Search .................. 219/216 PH; 400/120, 400/279; 346/76 PH, 76 R; 101/93.04

[56] References Cited

U.S. PATENT DOCUMENTS 3,501,615  3/1970  Merryman ........................... 219/216
3,777,116 12/1973  Brescia ................................ 219/216
4,070,587  1/1978  Hanakata ............................ 219/216
4,366,489 12/1982  Yamaguchi ......................... 219/216
4,376,942  3/1983  Toth .................................... 400/120

*Primary Examiner*—B. A. Reynolds
*Assistant Examiner*—Teresa J. Walberg
*Attorney, Agent, or Firm*—Staas & Halsey

[57] ABSTRACT

A semiconductor device is used, for example, for controlling and driving thermal heads of a facsimile apparatus and includes a first circuit activated when power is supplied to the semiconductor device and a second circuit activated only when both power and a power control signal are applied to the semiconductor device. The semiconductor device further includes a power switch circuit which includes a semiconductor electronic circuit and which supplies power to the second circuit only when the power control signal is applied thereto.

13 Claims, 5 Drawing Figures

SEMICONDUCTOR DEVICE FOR DRIVING THERMAL PRINT HEADS

BACKGROUND OF THE INVENTION (1) Field of the Invention

The present invention relates to a semiconductor device, more particularly to a semiconductor device which is used, for example, for controlling and driving thermal heads of a thermal printer used in a facsimile apparatus and which has power supplied to part of the internal circuits only when necessary.

(2) Description of the Prior Art

In general, a semiconductor device comprises a plurality of circuit portions. Some of the circuit portions require a continuous supply of power, while other circuit portions require a supply of power only during part of the operating time of the semiconductor device. When a semiconductor device is provided with a single switch circuit which turns the power on and off for all the circuit portions together, there is no problem with the above-mentioned former circuit portions, but power is wasted on the latter circuit portions. The result is a larger than necessary power consumption and heat generation in the semiconductor device.

Semiconductors are used, for example, in thermal printers used in facsimile apparatuses. Specifically, integrated circuit (IC) devices are used to supply signals to thermal heads to control the drive thereof. After the printing of characters in a line is finished, the printing paper is moved a predetermined length and the printing of a next line is effected.

In a conventional facsimile apparatus, a power supply voltage is applied to the IC devices even when not necessary, i.e., even when the printing paper is being moved and the printing operation by the thermal heads is not effected. The time for movement of the printing paper is about seven times as long as the time for the printing operation by the thermal heads. Therefore, the conventional IC device for controlling and driving the thermal heads wastes power and generates much heat.

SUMMARY OF THE INVENTION

It is, therefore, the principal object of the present invention to decrease the power consumption of a semiconductor device and to decrease the generation of heat therein by cutting off the power supplied to some circuit portions that are not in use.

According to the present invention, there is provided a semiconductor device formed on a single semiconductor chip including a first circuit which is activated when power is applied to the semiconductor device and input buffer circuits. The semiconductor device also includes output driver circuits and a second circuit which is activated only when both power and a power control signal are applied to the semiconductor device and which includes a data storing circuit.

DESCRIPTION OF THE PREFERRED EMBODIMENTS

Embodiments of the present invention will now be explained with reference to the attached drawings.

Figure 1:
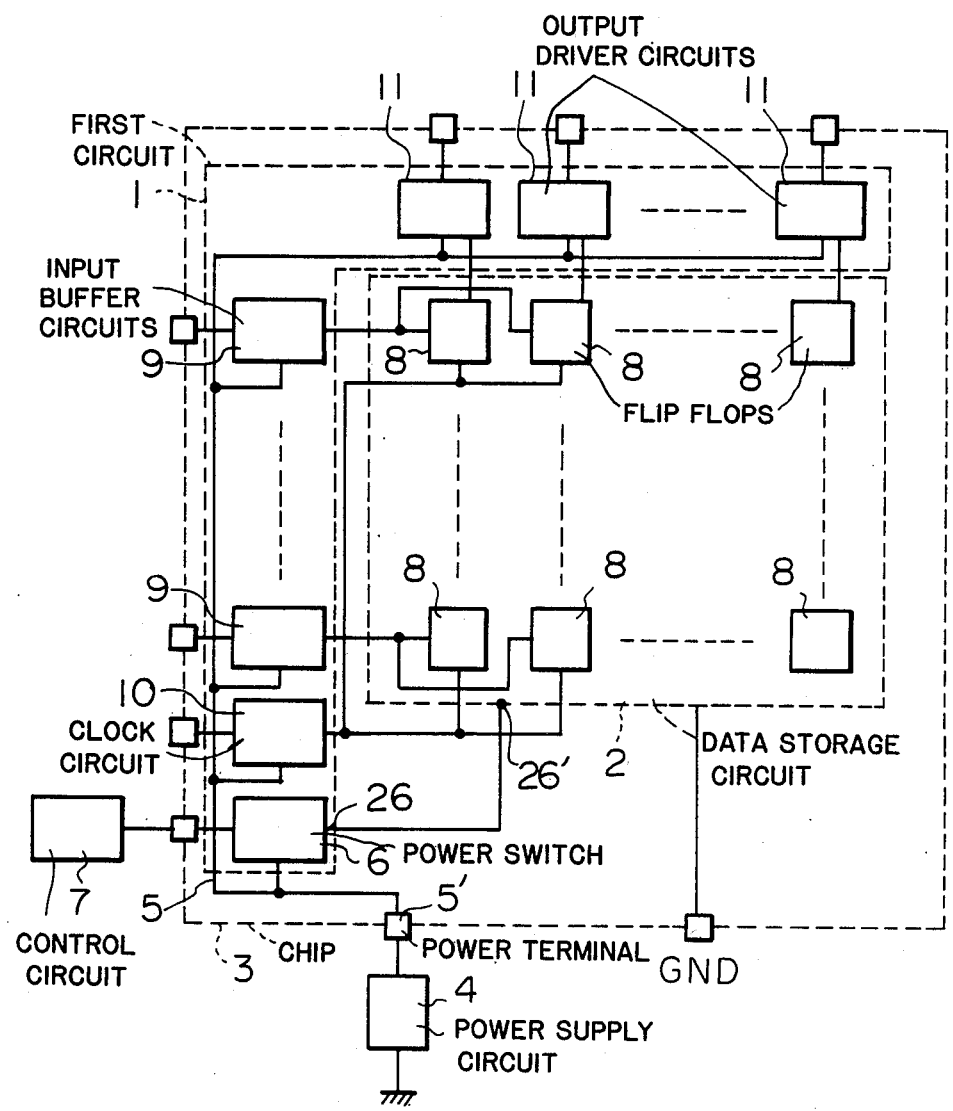
FIG. 1 is a block circuit diagram of a semiconductor device according to an embodiment of the present invention.

FIG. 1 is a schematic diagram of a semiconductor device, according to an embodiment of the present invention, used for controlling and driving thermal heads of a facsimile apparatus. The semiconductor device of FIG. 1 comprises a first circuit 1 which is always in an operating condition and a second circuit 2 which is sometimes in an operating condition and sometimes in a non-operating condition. The first circuit 1 and second circuit 2 are formed on a single semiconductor chip 3. A power supply circuit 4 is directly connected to the first circuit 1 through a power terminal 5' and a power line 5. The second circuit 2 is connected to the power supply circuit 4 through a power switch circuit 6 which is controlled by a control circuit 7.

The second circuit 2 is an internal circuit or a data storing circuit and comprises a plurality of flip-flop circuits 8 which are disposed, for example, in a matrix arrangement. The first circuit 1 is a peripheral circuit and comprises input buffer circuits 9, a clock circuit 10, output driver circuits 11, and the aforementioned power switch circuit 6. Each of the flip-flop circuits 8 of the second circuit 2 is, for example, a D-type flip-flop circuit whose data input terminal is connected to the output terminal of the input buffer circuit 9 disposed in the same row and whose clock input terminal is connected to the output terminal of the clock circuit 10. Each of the output terminals of the flip-flop circuits 8 is connected to the input terminal of the corresponding output driver circuit 11 whose output terminal is connected to a corresponding thermal head (not shown) of a facsimile apparatus. In FIG. 1, the illustration of the output buffers 11 is omitted except for the output buffers 11 connected to the flip-flop circuits 8 disposed in the uppermost row n of the second circuit 2.

Figure 2:
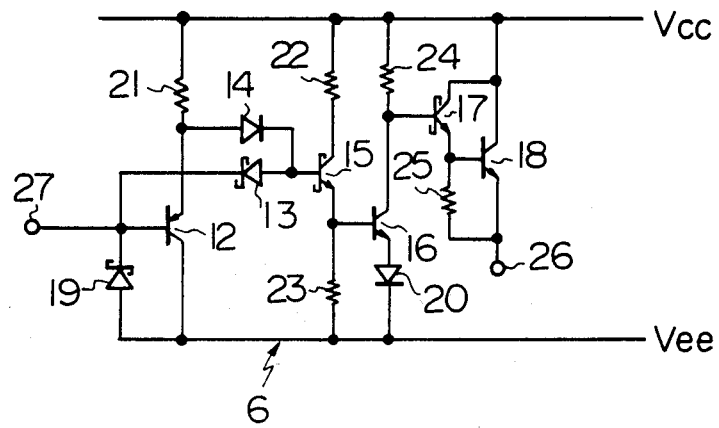
FIG. 2 is a circuit diagram of a power switch circuit used in the semiconductor device of FIG. 1.

FIG. 2 is a circuit diagram of the power switch circuit 6 arranged in the first circuit 1 which controls the supply of power to the second circuit 2. The power switch circuit 6 comprises a pnp-type transistor 12 whose base is connected to an input terminal 27 connected to the control circuit 7 (FIG. 1), an npn-type Schottky barrier transistor 15 whose base is connected to the input terminal 27 through a Schottky barrier diode 13 and to the emitter of the transistor 12 through a diode 14, an npn-type transistor 16 whose base is connected to the emitter of the transistor 15, and Darlington-connected npn-type transistors 17 and 18. The power switch circuit 6 further comprises a Schottky barrier diode 19, a diode 20, and resistors 21, 22, 23, 24, and 25. The emitter of the transistor 18 is the output terminal 26 of the power switch circuit 6.

Figure 3:
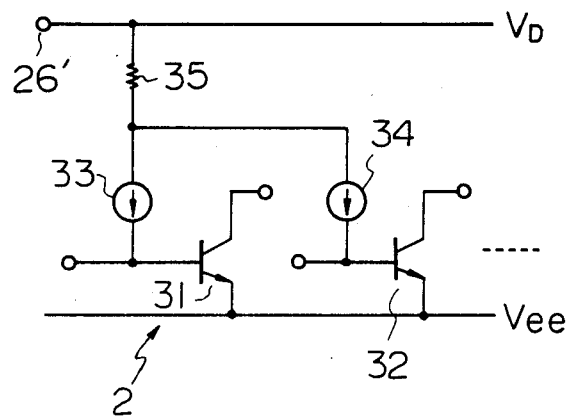
FIG. 3 is a circuit diagram of elements constituting inner circuits of the semiconductor device of FIG. 1.

FIG. 3 is a circuit diagram of the components of the flip-flop circuits 8 of the second circuit 2 of the semiconductor device of FIG. 1. Each of the flip-flop circuits 8 comprises integrated injection logic (IIL) gate circuits each comprising a switching transistor 31 and a current source circuit 33, a switching transistor 32 and a current source circuit 34, and so on. The current source circuits 33 and 34 are connected to a resistor 35.

The resistor 35 is connected between a terminal 26' of an internal power source $V_D$ and the base of the transistor 31 through current source 33 and between the terminal 26' and the base of the transistor 32 through current source 34. The terminal 26' is connected to the output terminal 26 of the power switch circuit 6 shown in FIG. 2.

The operation of the above-mentioned semiconductor device will now be described. When the thermal printer of the facsimile device is used, i.e., a printing operation by the thermal printer is effected, the control circuit 7 (FIG. 1) generates a power control signal having a low potential level to activate the power switch circuit 6. Thus, the operating voltage $V_D$, which is slightly lower than the power supply voltage $V_{cc}$ generated by the power supply circuit 4, is supplied to the second circuit 2 of the semiconductor device. That is, when the power control signal having a low potential level is supplied to the base of the transistor 12 of the power switch circuit 6 of FIG. 2 from the control circuit 7, the transistor 12 is turned on and the transistors 15 and 16 are turned off. Therefore, the Darlington connected transistors 17 and 18 are both turned on and the power supply voltage, whose potential is approximately $V_{cc} - 2 V_{BE}$, is supplied to the second circuit 2 via the output terminal 26, where $V_{BE}$ is the base-emitter voltage of each of the transistors 17 and 18. In this case, since the power switching circuit 6 comprising logic circuits, the switching of the potential of the output terminal 26 thereof is performed much faster than that of the potential of the main power source, for example, $V_{cc}$, whose switching time from low to high or vice versa is relatively long due to the capacitance in the main power circuits. Therefore, even if power is supplied to the second circuit 2 only when necessary, the operation of the second circuit 2 is not disturbed and the noises induced in the circuits are relatively small.

Simultaneously with the supply of power to the second circuit 2, print data are input to the input buffers 9 and the print data are input to the flip-flop circuits 8 under the control of clock pulses generated by the clock circuit 10. The data input to the flip-flop circuits 8 are transmitted to the output driver circuits 11 which drive the thermal heads connected thereto, whereby a printing operation according to the print data is performed.

After the printing operation is finished, the printing paper is moved a predetermined length to position the next line under the thermal heads. When the movement of the printing paper begins, the control circuit 7 generates a control signal, having a high potential level, to turn off the power switch circuit 6. That is, the transistor 12 of FIG. 2 is turned off, the transistors 15 and 16 are turned on, and the Darlington connected transistors 17 and 18 are turned off, thereby cutting off the power supplied to the flip-flop circuits 8 forming the second circuit 2.

In this manner, power is not supplied to the second circuit 2, during the period of movement of the printing paper. Since the movement period is about seven times as long as the printing period, cutting off the power to the second circuit 2 during the movement period enables a great decrease in the power consumption in the second circuit 2. It is also possible to decrease the heat generated by the semiconductor device. These advantageous effects become great when the power consumption of the second circuit 2 is large.

Power to the input buffers 9, the output driver circuits 11, and so on, in the first circuit 1 is not cut off even during the movement period of the printing paper. This is because these circuits 9, 11, and so on, are connected to external circuits. If the power is cut off at every movement period, the input buffers 9 may affect the external circuits connected thereto and the output driver circuits 11 may generate undesirable data due to the noise generated by the switching of the power. The power consumption of these circuits 9, 11 and so on, of the first circuit 1 is not that large, however, so there is no significant increase in the power consumption of the semiconductor device.

After the above-mentioned movement of the printing paper is finished, the printing operation of the next line is effected. After the printing operation of the last line is finished, the operation of the thermal printers is stopped.

Figure 4:
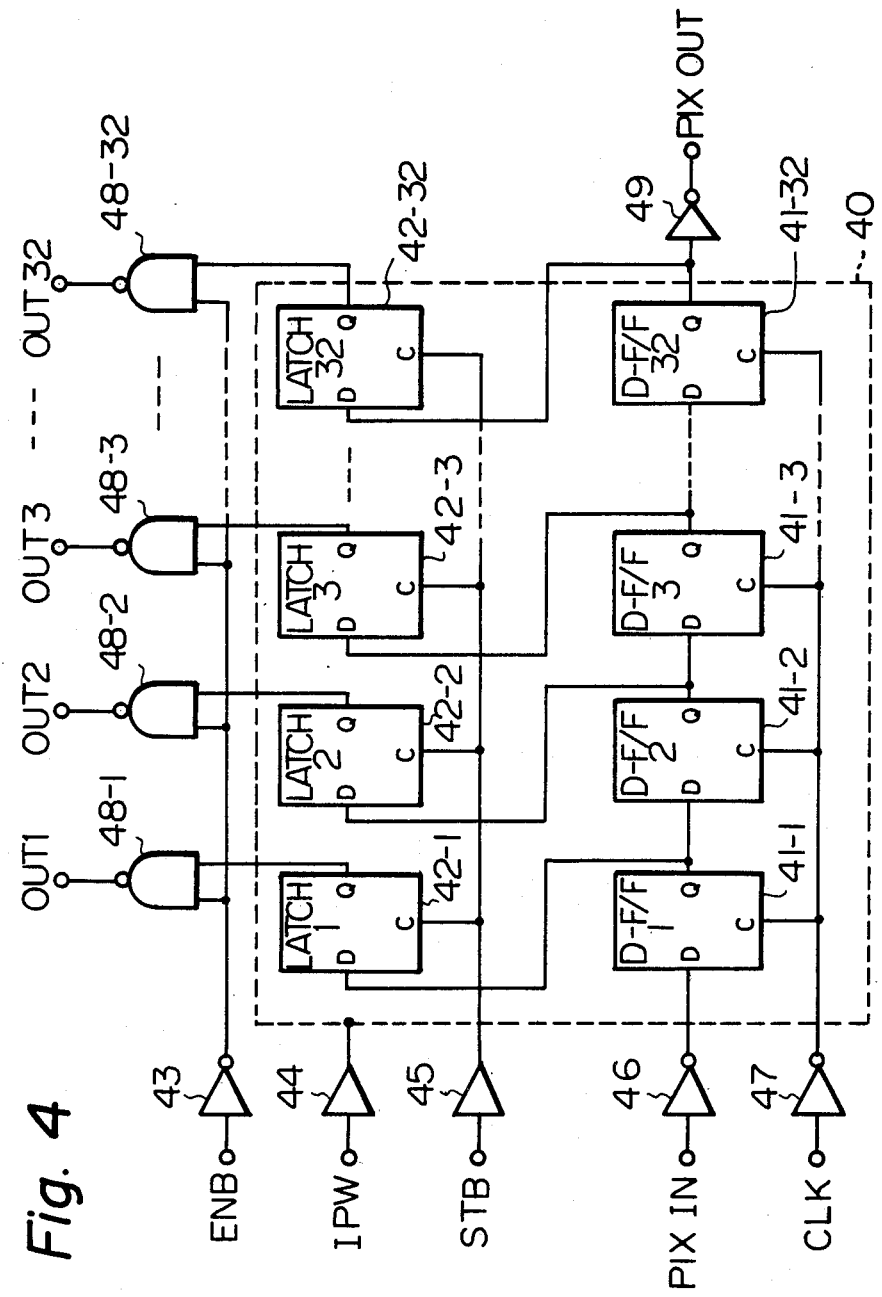
FIG. 4 is a block circuit diagram of a semiconductor device according to another embodiment of the present invention.

FIG. 4 is a circuit of a semiconductor device for controlling and driving a thermal printer of a facsimile apparatus according to another embodiment of the present invention. The semiconductor device of FIG. 4 comprises a first circuit including circuits 43 through 47, 48-1, 48-2, - - -, 48-32, and 49 and a second circuit 40 including a shift register composed of D-type flip-flop circuits 41-1, 41-2, - - -, 41-32 and latch circuits 42-1, 42-2, - - -, 42-32 which are composed of other D-type flip-flops. The first circuit is always activated and the second circuit 40 is activated only during the printing periods. In the first circuit, reference numerals 43, 46, 47, and 49 designate inverter type buffer amplifiers, reference numeral 45 designates a buffer amplifier, and reference numerals 48-1, 48-2, - - -, 48-32, designate NAND gate-type output buffers. Reference numeral 44 designates a buffer amplifier or a power switch circuit which has substantially the same circuit structure comprising a combination of the circuit of FIG. 2 and an inverter connected to the input terminal 27 of the circuit of FIG. 2.

Figure 5:
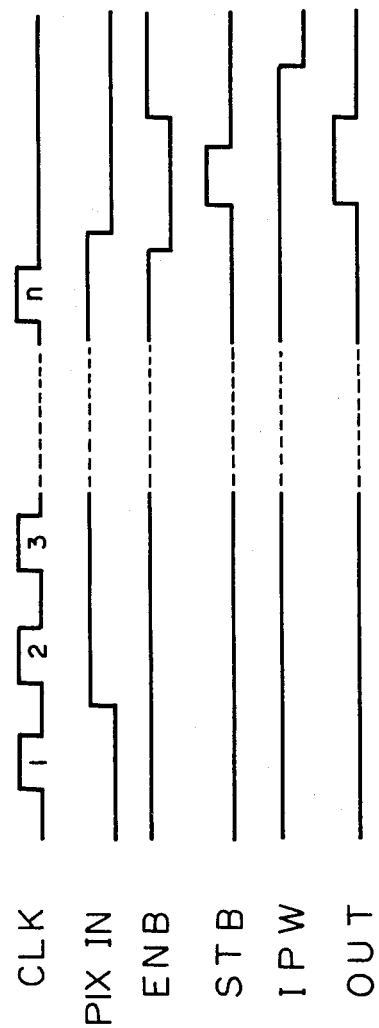
FIG. 5 is a waveform diagram of signals at every node of the semiconductor device of FIG. 4.

The operation of the semiconductor device of FIG. 4 will now be explained with reference to FIG. 5. Printing data PIX IN are serially input to the buffer amplifier 46 and to the shift register comprising D-type flip-flop circuits 41-1, 41-2, - - -, 41-32, and are sequentially shifted from the first flip-flop circuit 41-1 to the last flip-flop circuit 41-32 synchronously with clock pulses CLK. After the printing data are input to the flip-flop circuits 41-1, 41-2, - - -, 41-32, a strobe signal STB applied to the clock input terminals of the flip-flop circuits 42-1, 42-2, - - -, 42-32 changes from low to high. At the rising edge of the strobe signal STB, the data stored in the flip-flop circuits 41-1, 41-2, - - -, 41-32 of the shift register are latched by the flip-flop circuits 42-1, 42-2 - - -, 42-32, respectively. The data latched by the flip-flop circuits 42-1, 42-2, - - -, 42-32 are transmitted to the output buffer gates 48-1, 48-2, - - -, 48-32, respectively, and are output therefrom to drive thermal heads (not shown) during the time interval in which an enable signal ENB is low. After the printing operation is finished, a power control signal IPW is changed from high to low and the power source to the second circuit 40 is cut off. The power control signal IPW is changed from low to high at the beginning of input of the printing data PIX IN to the shift register, so that the second circuit 40 is not activated during each movement period of the printing paper.

We claim:

1. A semiconductor device formed on a single semiconductor chip operatively connected to receive a power control signal, comprising:

a first circuit activated when power is applied to the semiconductor device, comprising:
  input buffer circuits; and
  output driver circuits, operatively connected to said input buffer circuits; and
a second circuit, operatively connected to said first circuit, activated only when both power and the power control signal are applied to the semiconductor device, said second circuit comprising a data storing circuit operatively connected to said input buffer circuits and said output driver circuits.

2. A semiconductor device according to claim 1, wherein said semiconductor device further comprises a power switch circuit, operatively connected to said second circuit, for supplying power to said second circuit, for supplying power to said second circuit only when the power control signal is applied to said power switch circuit.

3. A semiconductor device according to claim 2, wherein said power switch circuit comprises switching transistors, operatively connected to said data storing circuit, forming a Darlington circuit and turning on and off under the control of said power control signal.

4. A semiconductor device according to claim 3, wherein said power switch circuit further comprises:
  a pnp-type emitter follower transistor operatively connected to receive the power control signal and outputting a first signal;
  an npn-type emitter follower transistor, operatively connected to said pnp-type emitter follower transistor, for receiving the first output signal of said pnp-type emitter follower transistor and outputting a second output signal; and
  an npn-type inverter transistor, operatively connected to said npn-type emitter follower transistor, for receiving the second output signal of said npn-type emitter follower transistor and outputting a third output signal, wherein said Darlington circuit comprises two npn-type Darlington connected transistors, operatively connected to said npn-type inverter transistor, for receiving the third output signal of said npn-type inverter transistor and switching on and off the power supplied to said second circuit.

5. A semiconductor device according to claim 2, wherein said power switch circuit is included in said first circuit.

6. A semiconductor device operatively connected to external circuits, according to claim 5, wherein said input buffer circuits and output driver circuits included in said first circuit are directly connected to the external circuits, and wherein said data storing circuit included in said second circuit is not directly connected to the external circuits.

7. A semiconductor device according to claim 5, wherein said input buffer circuits are operatively connected to receive input signals and provide output signals, and wherein said data storing circuit comprises a plurality of flip-flip circuits, respectively, operatively connected to said input buffer circuits, having input terminals for receiving the output signals provided by said input buffer circuits and having output terminals operatively connected to said output driver circuits.

8. A semiconductor device operatively connected to a thermal printer having thermal heads, according to claim 7, wherein said output driver circuits are operatively connected to the thermal heads of the thermal printer.

9. A semiconductor device according to claim 5, wherein said data storing circuit comprises a shift register including a plurality of cascade-connected flip-flop circuits each having an output terminal and latch circuits each having an output terminal, respectively, operatively connected to said output terminals of said cascade-connected flip-flop circuits.

10. A semiconductor device according to claim 9, wherein said latch circuits are operatively connected to said output driver circuits.

11. A semiconductor device formed on a single semiconductor chip, operatively connected to receive a power control signal and operatively connectable to a power supply, comprising:
  a first circuit made operable when power is applied to the semiconductor device, comprising:
    input buffer circuits operatively connected to the power supply;
    output driver circuits operatively connected to said input buffer circuits and the power supply;
    a clock circuit operatively connected to the power supply and said output driver circuits; and
    a power switch circuit operatively connected to the power supply and operatively connected to receive the power control signal; and
  a second circuit, operatively connected to said first circuit, made operable only when both the power control signal and power supply are supplied to the semiconductor device, comprising a data storing circuit operatively connected to said power switch circuit.

12. A semiconductor device according to claim 11, wherein said power switch circuit has an input terminal and an output terminal and comprises:
  a pnp transistor operatively connected to the input terminal;
  an npn Schottky barrier transistor operatively connected to said pnp transistor;
  a first npn-transistor operatively connected to said npn Schottky barrier transistor;
  a second npn transistor operatively connected to said first npn transistor; and
  a third npn transistor operatively connected to said second npn transistor, forming a Darlington connection with said second npn transistor and the output terminal.

13. A semiconductor device according to claim 12 wherein said data storing circuit comprises:
  at least one switching transistor operatively connected to the output terminal of said power switch circuit; and
  at least one current source operatively connected to said at least one switching transistor and the output terminal of said power switch circuit.

* * * * *

UNITED STATES PATENT AND TRADEMARK OFFICE
CERTIFICATE OF CORRECTION

PATENT NO. : 4,447,704

DATED : MAY 8, 1984

INVENTOR(S) : HIROKAZU SUZUKI ET AL.

It is certified that error appears in the above-identified patent and that said Letters Patent is hereby corrected as shown below:

Col. 1, line 55, "circuits." should be --circuits and output driver circuits--; and
line 56, delete "output driver circuits and".

Col. 3, line 28, "comprising" should be --comprises--.

Signed and Sealed this

Seventh Day of May 1985

[SEAL]

Attest:

DONALD J. QUIGG

Attesting Officer     Acting Commissioner of Patents and Trademarks